(12) United States Patent
Musfeldt et al.

(10) Patent No.: US 9,331,996 B2
(45) Date of Patent: *May 3, 2016

(54) SYSTEMS AND METHODS FOR IDENTIFYING DEVICES BY A TRUSTED SERVICE MANAGER

(71) Applicant: First Data Corporation, Greenwood Village, CO (US)

(72) Inventors: Roger Lynn Musfeldt, Omaha, NE (US); Brent Dewayne Adkisson, Omaha, NE (US); Brian Kean, Missouri Valley, IA (US)

(73) Assignee: First Data Corporation, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,703

(22) Filed: May 2, 2014

(65) Prior Publication Data
US 2014/0237551 A1    Aug. 21, 2014

Related U.S. Application Data

(62) Division of application No. 13/481,377, filed on May 25, 2012, now Pat. No. 8,752,127.

(60) Provisional application No. 61/490,501, filed on May 26, 2011.

(51) Int. Cl.
*H04L 29/06* (2006.01)
*H04L 9/32* (2006.01)
*H04W 12/02* (2009.01)
(Continued)

(52) U.S. Cl.
CPC ............... *H04L 63/08* (2013.01); *G06Q 40/00* (2013.01); *H04L 9/3234* (2013.01); *H04W 12/02* (2013.01); *G06Q 20/00* (2013.01); *H04L 63/061* (2013.01); *H04L 63/126* (2013.01); *H04L 2209/80* (2013.01); *H04L 2463/061* (2013.01); *H04L 2463/062* (2013.01); *H04W 4/001* (2013.01)

(58) Field of Classification Search
CPC .................................................. H04L 63/0853
USPC ......................................................... 713/170
See application file for complete search history.

(56) References Cited

U.S. PATENT DOCUMENTS 5,491,750 A    2/1996  Bellare et al.
6,044,350 A    3/2000  Weiant, Jr. et al.
(Continued)

OTHER PUBLICATIONS

Mid Tex Federal Credit Union, Mid-Texan 1st Quarter Newsletter, Mar. 31, 2009. See pp. 7-8 'Tellers Tips' http://www.mtfcu.org/Newsletter%202.htm.
(Continued)

*Primary Examiner* — Longbit Chai
(74) *Attorney, Agent, or Firm* — Sutherland Asbill & Brennan LLP

(57) ABSTRACT

Embodiments of the disclosure provide systems and methods for identifying devices by a trusted service manager. According to one example embodiments of the disclosure, a method for identifying communications is provided. The method can include receiving, by a service provider from a device, a message comprising card production life cycle (CPLC) information associated with a secure element incorporated into the device; and evaluating, by the service provider, the received CPLC information in order to identify the secure element.

1 Claim, 5 Drawing Sheets

(51) Int. Cl.
*G06Q 40/00* (2012.01)
*H04W 4/00* (2009.01)
*G06Q 20/00* (2012.01)

(56) References Cited

U.S. PATENT DOCUMENTS

| | | | |
|---|---|---|---|
| 6,084,969 A | 7/2000 | Wright et al. |
| 6,163,771 A | 12/2000 | Walker et al. |
| 6,422,462 B1 | 7/2002 | Cohen |
| 6,931,382 B2 | 8/2005 | Laage et al. |
| 7,213,147 B2 | 5/2007 | Tuvell et |
| 7,353,388 B1 | 4/2008 | Gilman et al. |
| 7,548,621 B1 | 6/2009 | Smith et al. |
| 7,702,553 B1 | 4/2010 | Dickelman |
| 7,702,577 B1 | 4/2010 | Dickelman |
| 8,078,867 B2 | 12/2011 | Brown et al. |
| 8,099,363 B1 | 1/2012 | Kilchenstein, Jr. |
| 8,386,381 B1 | 2/2013 | Barton et al. |
| 8,413,894 B2 | 4/2013 | Bona et al. |
| 8,423,548 B1 | 4/2013 | Trandal et al. |
| 8,489,740 B2 | 7/2013 | Schneider |
| 8,560,849 B2 | 10/2013 | Machani et al. |
| 8,627,092 B2 | 1/2014 | Fischer et al. |
| 8,689,012 B1 | 4/2014 | Bierbaum et al. |
| 8,752,127 B2 | 6/2014 | Musfeldt et al. |
| 8,775,305 B2 | 7/2014 | Pointer |
| 8,880,886 B2 | 11/2014 | Kean et al. |
| 2001/0029485 A1 | 10/2001 | Brody et al. |
| 2002/0091646 A1 | 7/2002 | Lake et al. |
| 2002/0128977 A1 | 9/2002 | Nambiar et al. |
| 2002/0133467 A1 | 9/2002 | Hobson et al. |
| 2002/0147658 A1 | 10/2002 | Kwan |
| 2002/0156689 A1 | 10/2002 | Spalding |
| 2003/0014360 A1 | 1/2003 | Arditti et al. |
| 2003/0023549 A1 | 1/2003 | Armes et al. |
| 2004/0030659 A1 | 2/2004 | Gueh |
| 2004/0031856 A1 | 2/2004 | Atsmon et al. |
| 2004/0123102 A1 | 6/2004 | Gehrmann et al. |
| 2004/0155101 A1 | 8/2004 | Royer et al. |
| 2004/0159700 A1 | 8/2004 | Khan et al. |
| 2004/0172340 A1 | 9/2004 | Bishop et al. |
| 2005/0092839 A1 | 5/2005 | Oram |
| 2005/0182855 A1 | 8/2005 | Apostolopoulos et al. |
| 2005/0198506 A1 | 9/2005 | Qi et al. |
| 2005/0221814 A1 | 10/2005 | Fagan et al. |
| 2005/0250538 A1 | 11/2005 | Narasimhan et al. |
| 2005/0269402 A1 | 12/2005 | Spitzer et al. |
| 2005/0279827 A1 | 12/2005 | Mascavage et al. |
| 2006/0000900 A1 | 1/2006 | Fernandes et al. |
| 2006/0040642 A1 | 2/2006 | Boris et al. |
| 2006/0064458 A1 | 3/2006 | Gehrmann |
| 2006/0077034 A1 | 4/2006 | Hillier |
| 2006/0131410 A1 | 6/2006 | Fernandes et al. |
| 2006/0179305 A1 | 8/2006 | Zhang |
| 2006/0206350 A1 | 9/2006 | Edwards et al. |
| 2007/0063024 A1 | 3/2007 | Guillot |
| 2007/0091843 A1 | 4/2007 | Patel et al. |
| 2007/0180262 A1 | 8/2007 | Benson |
| 2007/0203732 A1 | 8/2007 | Griegel et al. |
| 2008/0010217 A1 | 1/2008 | Hobson et al. |
| 2008/0037785 A1 | 2/2008 | Gantman et al. |
| 2008/0049940 A1 | 2/2008 | Kocher |
| 2008/0052183 A1 | 2/2008 | Hobson et al. |
| 2008/0126252 A1 | 5/2008 | Katz |
| 2008/0130902 A1 | 6/2008 | Foo Kune et al. |
| 2008/0136592 A1 | 6/2008 | Malik et al. |
| 2008/0141031 A1 | 6/2008 | Oba et al. |
| 2008/0162929 A1 | 7/2008 | Ishikawa et al. |
| 2008/0257952 A1 | 10/2008 | Zandonadi |
| 2008/0288404 A1 | 11/2008 | Pirzadeh et al. |
| 2008/0303665 A1 | 12/2008 | Naik et al. |
| 2008/0305772 A1 | 12/2008 | Balasubramanian et al. |
| 2009/0006262 A1 | 1/2009 | Brown et al. |
| 2009/0068988 A1 | 3/2009 | Cofta |
| 2009/0074189 A1 | 3/2009 | Ryu et al. |
| 2009/0099961 A1 | 4/2009 | Ogilvy |
| 2009/0108064 A1 | 4/2009 | Fernandes et al. |
| 2009/0132424 A1 | 5/2009 | Kendrick et al. |
| 2009/0134217 A1 | 5/2009 | Flitcroft et al. |
| 2009/0157557 A1 | 6/2009 | Hobson et al. |
| 2009/0164774 A1 | 6/2009 | Sherkin |
| 2009/0173784 A1 | 7/2009 | Yang |
| 2009/0181644 A1 | 7/2009 | Humphrey et al. |
| 2009/0235065 A1 | 9/2009 | Nilsson et al. |
| 2009/0248581 A1 | 10/2009 | Brown |
| 2009/0307482 A1 | 12/2009 | McCann |
| 2010/0005307 A1 | 1/2010 | Prashanth |
| 2010/0106967 A1 | 4/2010 | Johansson et al. |
| 2010/0111306 A1 | 5/2010 | Zheng et al. |
| 2010/0116881 A1 | 5/2010 | Flood et al. |
| 2010/0161778 A1 | 6/2010 | Guinard et al. |
| 2010/0174649 A1 | 7/2010 | Bouchard |
| 2010/0191966 A1 | 7/2010 | Immonen |
| 2010/0192220 A1 | 7/2010 | Heizmann et al. |
| 2010/0241847 A1 | 9/2010 | van der Horst et al. |
| 2010/0257360 A1 | 10/2010 | Bae et al. |
| 2010/0274691 A1 | 10/2010 | Hammad et al. |
| 2010/0280950 A1 | 11/2010 | Faith et al. |
| 2010/0293094 A1 | 11/2010 | Kolkowitz et al. |
| 2011/0010538 A1 | 1/2011 | Falk et al. |
| 2011/0047072 A1 | 2/2011 | Ciurea |
| 2011/0047075 A1 | 2/2011 | Fourez |
| 2011/0087547 A1 | 4/2011 | Amaro et al. |
| 2011/0087596 A1 | 4/2011 | Dorsey |
| 2011/0101109 A1 | 5/2011 | Bona et al. |
| 2011/0137802 A1 | 6/2011 | Spies et al. |
| 2011/0154021 A1 | 6/2011 | McCann et al. |
| 2011/0208965 A1 | 8/2011 | Machani |
| 2011/0231270 A1 | 9/2011 | Dykes et al. |
| 2011/0231319 A1 | 9/2011 | Bayod et al. |
| 2011/0238575 A1 | 9/2011 | Nightengale et al. |
| 2011/0264567 A1 | 10/2011 | Clyne |
| 2011/0282789 A1 | 11/2011 | Carroll et al. |
| 2011/0288918 A1 | 11/2011 | Cervenka et al. |
| 2011/0309309 A1 | 12/2011 | Hartmann et al. |
| 2011/0314274 A1 | 12/2011 | Swartz |
| 2012/0017089 A1 | 1/2012 | Kocher |
| 2012/0022945 A1 | 1/2012 | Falkenborg et al. |
| 2012/0023022 A1 | 1/2012 | Carroll et al. |
| 2012/0095857 A1 | 4/2012 | McKelvey et al. |
| 2012/0097739 A1 | 4/2012 | Babu et al. |
| 2012/0108295 A1 | 5/2012 | Schell et al. |
| 2012/0109734 A1 | 5/2012 | Fordyce, III et al. |
| 2012/0130898 A1 | 5/2012 | Snyder et al. |
| 2012/0159105 A1 | 6/2012 | von Behren et al. |
| 2012/0172089 A1* | 7/2012 | Bae et al. ............ 455/558 |
| 2012/0174189 A1 | 7/2012 | Lim et al. |
| 2012/0190386 A1 | 7/2012 | Anderson |
| 2012/0197802 A1 | 8/2012 | Smith et al. |
| 2012/0203698 A1 | 8/2012 | Duncan et al. |
| 2012/0215610 A1 | 8/2012 | Amaro et al. |
| 2012/0239479 A1 | 9/2012 | Amaro et al. |
| 2012/0239574 A1 | 9/2012 | Smith et al. |
| 2012/0296741 A1 | 11/2012 | Dykes |
| 2012/0296824 A1 | 11/2012 | Rosano |
| 2012/0300932 A1 | 11/2012 | Cambridge et al. |
| 2012/0300938 A1 | 11/2012 | Kean et al. |
| 2012/0303310 A1 | 11/2012 | Musfeldt |
| 2012/0303496 A1 | 11/2012 | Musfeldt |
| 2012/0303503 A1 | 11/2012 | Cambridge et al. |
| 2012/0303961 A1 | 11/2012 | Kean et al. |
| 2012/0304254 A1 | 11/2012 | Musfeldt et al. |
| 2012/0304255 A1 | 11/2012 | Carnes |
| 2012/0317019 A1 | 12/2012 | Carnes |
| 2013/0179695 A1 | 7/2013 | Zollinger et al. |

OTHER PUBLICATIONS

Non-final Office Action for U.S. Appl. No. 13/481,352 mailed Jun. 13, 2013.
Non-final Office Action for U.S. Appl. No. 13/481,437 mailed Sep. 9, 2013.
Non-final Office Action for U.S. Appl. No. 13/481,377 mailed Oct. 10, 2013.

(56) References Cited

OTHER PUBLICATIONS

Non-final Office Action for U.S. Appl. No. 13/481,433 mailed Oct. 23, 2013.
Final Office Action for U.S. Appl. No. 13/481,352 mailed Dec. 17, 2013.
Notice of Allowance for U.S. Appl. No. 13/481,437 mailed Dec. 26, 2013.
Notice of Allowance for U.S. Appl. No. 13/481,377 mailed Jan. 28, 2014.
Non-final Office Action for U.S. Appl. No. 13/481,387 mailed Feb. 6, 2014.
Final Office Action for U.S. Appl. No. 13/481,433 mailed Apr. 10, 2014.
Non-final Office Action for U.S. Appl. No. 13/481,394 mailed May 21, 2014.
Non-final Office Action for U.S. Appl. No. 13/481,364 mailed Jun. 4, 2014.
Final Office Action for U.S. Appl. No. 13/481,387 mailed Jun. 25, 2014.
Non-final Office Action for U.S. Appl. No. 13/481,356 mailed Jun. 27, 2014.
Notice of Allowance for U.S. Appl. No. 13/481,433 mailed Jun. 30, 2014.
Non-final Office Action response for U.S. Appl. No. 13/481,352 mailed Oct. 14, 2013.
Non-final Office Action response for U.S. Appl. No. 13/481,437 mailed Nov. 20, 2013.
Non-final Office Action response for U.S. Appl. No. 13/481,377 mailed Jan. 10, 2014.
Non-final Office Action response for U.S. Appl. No. 13/481,433 mailed Jan. 23, 2014.
Final Office Action response for U.S. Appl. No. 13/481,352 mailed Mar. 4, 2014.
Advisory Action for U.S. Appl. No. 13/481,352 mailed Mar. 14, 2014.
Advisory Action response for U.S. Appl. No. 13/481,352 mailed Mar. 17, 2014.
Non-final Office Action response for U.S. Appl. No. 13/481,387 mailed Apr. 21, 2014.
Final Office Action response for U.S. Appl. No. 13/481,433 mailed Jun. 10, 2014.
Final Office Action response for U.S. Appl. No. 13/481,387 mailed Jun. 25, 2014.
Non-final Office Action response for U.S. Appl. No. 13/481,394 mailed Aug. 15, 2014.
Non-final Office Action response for U.S. Appl. No. 13/481,364 mailed Sep. 4, 2014.
Advisory Action for U.S. Appl. No. 13/481,387 mailed Sep. 4, 2014.
Advisory Action response for U.S. Appl. No. 13/481,387 mailed Sep. 25, 2014.
Non-final Office Action response for U.S. Appl. No. 13/481,356 mailed Sep. 29, 2014.
Final Office Action for U.S. Appl. No. 13/481,364 mailed Nov. 24, 2014.
Non-final Office Action for U.S. Appl. No. 13/481,346 mailed Dec. 4, 2014.
Final Office Action for U.S. Appl. No. 13/481,356 mailed Dec. 12, 2014.

* cited by examiner

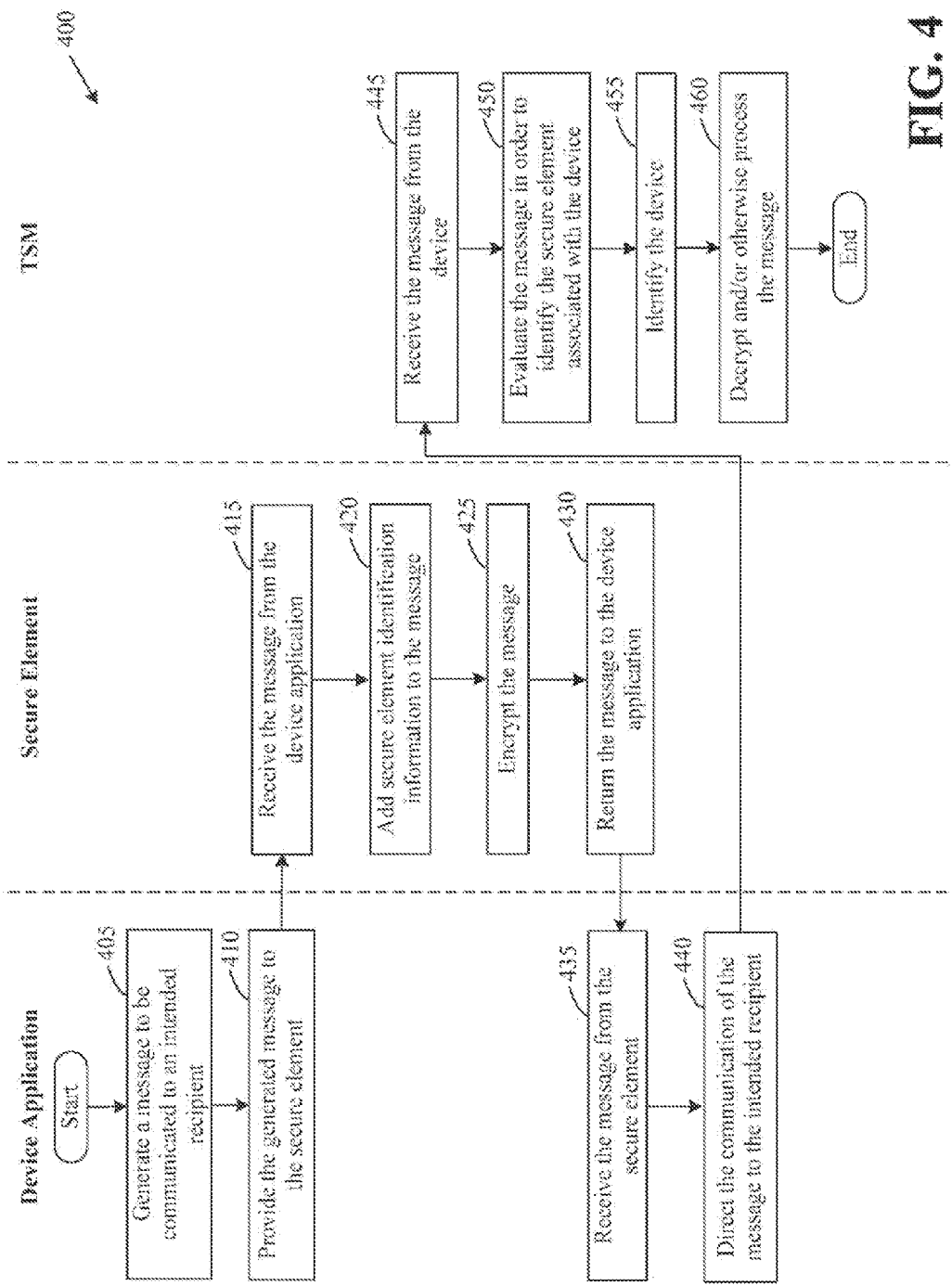

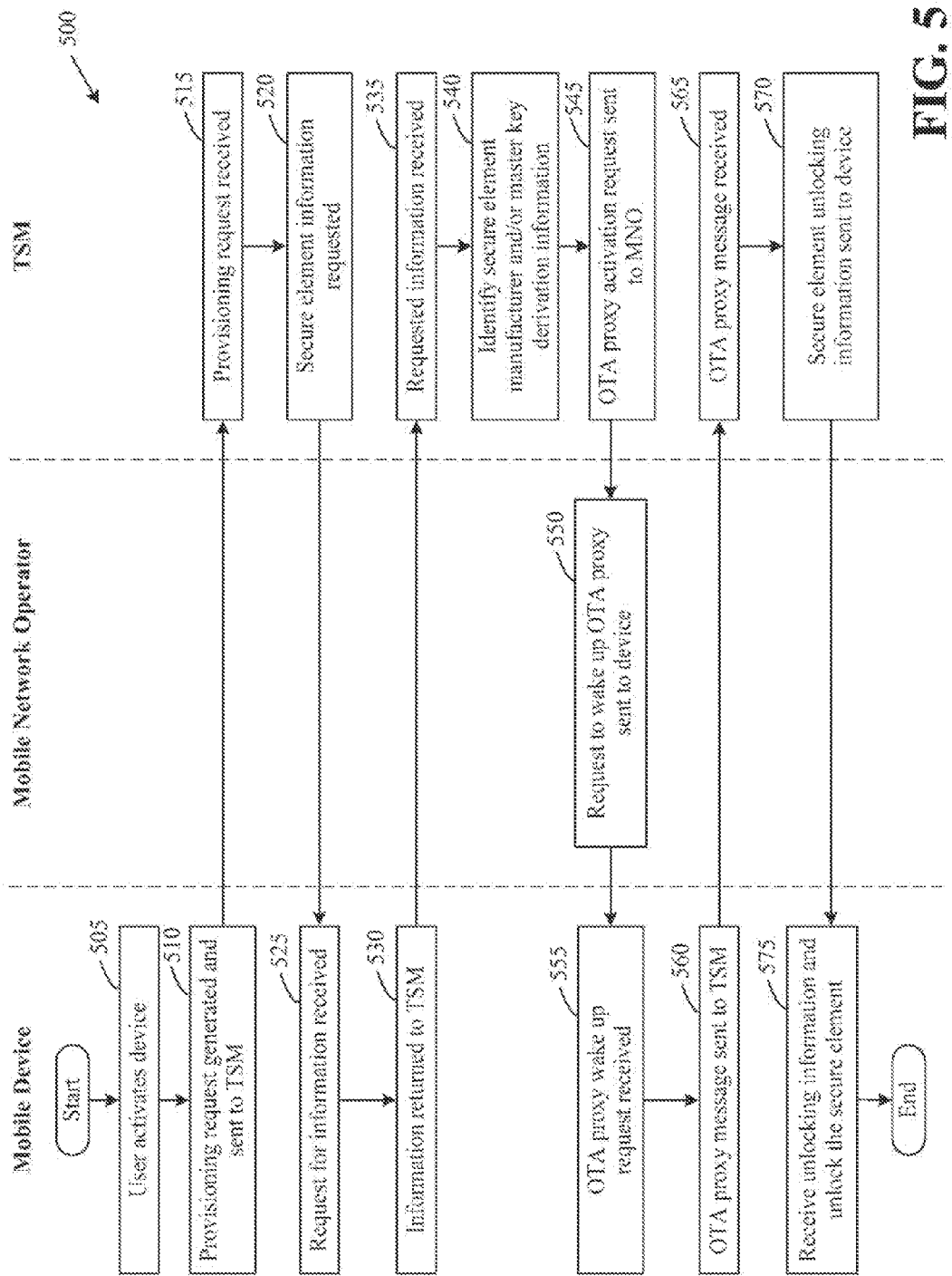

SYSTEMS AND METHODS FOR IDENTIFYING DEVICES BY A TRUSTED SERVICE MANAGER

RELATED APPLICATIONS

This application is a divisional of U.S. application Ser. No. 13/481,377, titled "Systems and Methods for Identifying Devices by a Trusted Service Manager," filed on May 25, 2012, which claims priority benefit of U.S. Provisional Application No. 61/490,501, titled "Trusted Service Manager," filed on May 26, 2011, the contents of both applications are incorporated herein by reference.

FIELD OF THE DISCLOSURE

Embodiments of the disclosure relate generally to devices that include secure elements, and more specifically to systems and methods for identifying the devices by a trusted service manager.

BACKGROUND OF THE DISCLOSURE

Mobile devices, such as cell phones, personal digital assistants ("PDAs"), smart phones, and other similar devices, have increasingly been utilized to provide additional functionality beyond traditional voice communications. One component of enabling the mobile devices to support these additional functionalities includes installing software applications, such as wallet applications, on the mobile devices. Mobile device applications can facilitate a variety of services performed by or with the mobile devices, including payment applications (e.g., prepaid, credit, debit, etc.), loyalty or incentive applications, transportation payment applications, access control applications, entertainment applications, and the like. In order to facilitate security for sensitive data, such as account data and transaction data, a secure element or secure smart chip is often incorporated into the mobile device.

In conventional systems, when a transaction is completed by a mobile device, the mobile device is identified by a unique mobile device identifier, such as a Mobile Subscriber Integrated Services Digital Network ("MSISDN") number or an International Mobile Equipment Identity/Mobile Equipment Identifier ("IMEI/MEID"). However, as other types of devices, such as tablets, are equipped with secure elements and/or near filed communication chips, the use of a mobile device identifier may not be adequate because some devices may not have an MSISDN or an IMEI/MEID. Additionally, a secure element may be removed from a device and inserted into a different device, thereby making identification and authentication of the secure element more difficult. Accordingly, there is an opportunity for improved systems and methods for identifying devices and secure elements by a service provider.

Additionally, when secure elements or smart chips are fabricated, they are typically "locked" and the locked chips are incorporated into devices. A service provider will often be required to unlock the secure element prior to personalizing the secure element and/or driving data to the secure element. However, different manufacturers often utilize different types of security techniques and encryption techniques to lock the secure element. Accordingly, there is an opportunity for improved systems and methods for performing an initial "unlocking" of secure elements.

BRIEF DESCRIPTION OF THE DISCLOSURE

Embodiments of the disclosure may provide systems and methods for identifying devices by a trusted service manager. According to one example embodiment of the disclosure, a method for identifying communications is provided. The method can include receiving, by a service provider from a device, a message comprising card production life cycle (CPLC) information associated with a secure element incorporated into the device; and evaluating, by the service provider, the received CPLC information in order to identify the secure element. In certain embodiments, one or more operations can be performed by one or more computers associated with a service provider.

According to another embodiment, a method for incorporating identification information into device communications is provided. The method can include receiving, by a secure element associated with a device from an application stored on a separate memory of the device, a message to be communicated to a recipient. The method can further include associating, by the secure element, secure element identification information into the received message. The method can also include providing, by the secure element, the modified message to the application. Further, the method can include directing, by the application, communication of the modified message to the recipient, wherein the recipient utilizes the secure element identification information to identify an originator of the message. In certain embodiments, one or more operations can be performed by one or more computers associated with a service provider.

According to another embodiment, a system for identifying communications can be provided. The system may include at least one memory and at least one processor. The at least one memory may be configured to store computer-executable instructions. The at least one processor may be configured to access the at least one memory and execute the computer-executable instructions to: receive, from a device, a message comprising card production life cycle (CPLC) information associated with a secure element incorporated into the device; and evaluate the received CPLC information in order to identify the secure element. In certain embodiments, one or more operations can be performed by one or more computers associated with a service provider.

According to yet another embodiment, a system for identifying communications can be provided. The system may include at least one memory and at least one processor. The at least one memory may be configured to store computer-executable instructions. The at least one processor may be configured to access the at least one memory and execute the computer-executable instructions to: receive, by a secure element associated with a device from an application stored on a separate memory of the device, a message to be communicated to a recipient; associate by the secure element, secure element identification information into the received message; provide, by the secure element, the modified message to the application; direct, by the application, communication of the modified message to the recipient, wherein the recipient utilizes the secure element identification information to identify an originator of the message. In certain embodiments, one or more operations can be performed by one or more computers associated with a service provider.

Additional systems, methods, apparatus, features, and aspects are realized through the techniques of various embodiments of the disclosure. Other embodiments and aspects of the disclosure are described in detail herein and are considered a part of the claimed disclosure.

Other advantages and features can be understood with reference to the description and to the drawings.

BRIEF DESCRIPTION OF THE FIGURES

FIG. 4 illustrates a flow diagram of an example process for identifying a device or secure element by a trusted service manager, according to an example embodiment of the disclosure.

FIG. 5 illustrates a flow diagram of an example process for unlocking a device, according to an example embodiment of the disclosure.

DETAILED DESCRIPTION

Figure 1:
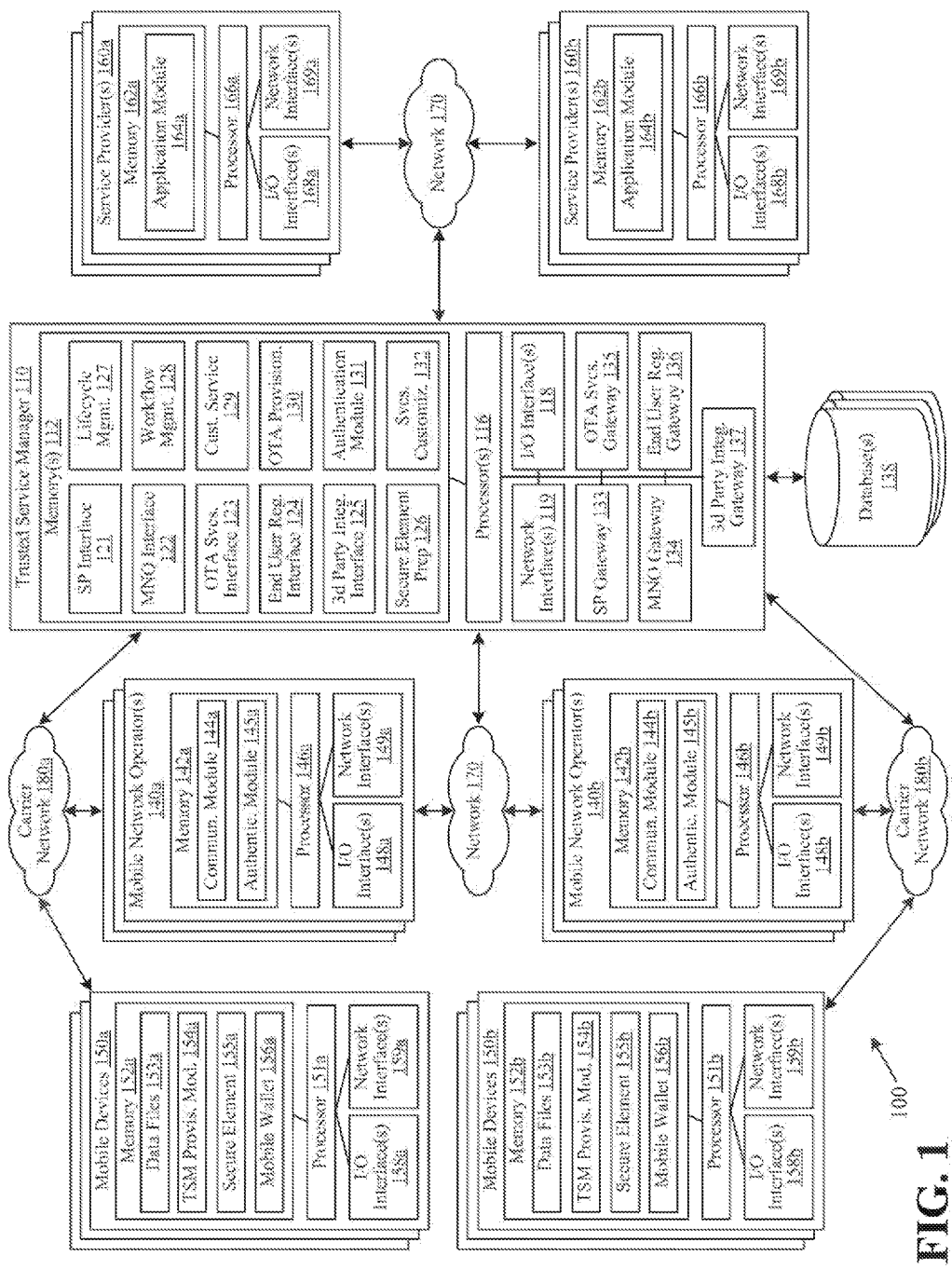
FIG. 1 illustrates a block diagram of an example trusted service management system and associated integration, according to an example embodiment of the disclosure.

Various embodiments of the disclosure are directed to the identification of devices. In certain embodiments of the disclosure, a device, such as a mobile device or tablet, may include at least one secure element. A secure element may be, for example, a smart chip and/or processing element that is associated with a device, such as a Universal Integrated Circuit Card ("UICC"), Subscriber Identity Module ("SIM"), and the like. The secure element may be configured to perform a wide variety of different functions on behalf of the device, such as message processing functions, authentication functions, and/or encryption functions. For example, the secure element may be configured to communicate with other elements of the device, such as a general or shared memory chip associated with the device. In this regard, the secure element may process messages and/or perform authentication functions on behalf of other device elements and/or device applications, such as a mobile wallet application stored within a general memory or shared memory of the device.

According to an aspect of the disclosure, secure element identification information may be included in and/or appended to messages output by the device. For example, the secure element may include at least one application configured to add secure element identification information to messages generated by the secure element and/or to messages processed by the secure element on behalf of other device applications (e.g., a mobile wallet, etc.). As a result of associated secure element identification information into a message, a recipient of the message, such as a trusted service manager or other service provider, may identify the secure element. In other words, device management may be performed on by a back end server at a secure element level. In this regard, identification and/or management by a trusted service manager may be device independent. As a result, a secure element may be identified even if the secure element is moved to a different device. Additionally, devices and/or secure elements may be identified even if the device does not include common identification information, such as a MSISDN or an IMEI/MEID.

As desired in various embodiments of the disclosure, a wide variety of different types of secure element identification information may be utilized to facilitate secure element and/or device identification. In certain embodiments, card production life cycle ("CPLC") information associated with the secure element may be utilized for identification purposes. For example, a manufacturer identifier and/or a chip serial number included in the CPLC information may be utilized for identification purposes. CPLC information may include variable length data associated with any integrated circuit ("IC") incorporated into a device, such as a secure element chip and/or a subscriber identity module ("SIM") card. A wide variety of information may be included in CPLC data, including but not limited to, an identifier of an IC fabricator (e.g., a manufacturer), an IC type, an operating system identifier, an operating system release date, an operating system release level, an IC fabrication date, an IC serial number, an IC batch identifier, an IC module fabricator, an IC module packaging date, an IC manufacturer, an IC embedding date, an IC pre-personalizer identification, an IC pre-personalizer equipment date, an IC pre-personalizer equipment identifier, an IC personalizer identifier, an IC personalization date, and/ or an IC personalization equipment identifier. In certain embodiments, CPLC data may be provided by a chip and/or a mobile device as a tag or data string.

In certain embodiments of the disclosure, at least a portion of the secure element information (e.g., the CPLC data, etc.) may additionally be utilized to facilitate an initial unlocking of the secure element. For example, during a registration of a device (e.g., a mobile device, etc.) with a trusted service manager or another service provider, information associated with the locking of the secure element may be communicated to the service provider. In one example embodiment, the information associated with the locking of the secure element may be included in CPLC data that is communicated to the service provider. A wide variety of locking information may be included in the CPLC data as desired in various embodiments of the disclosure, including but not limited to, an identifier of a manufacturer or fabricator of the secure element, an identifier of a master key to be utilized to unlock the secure element (e.g., a numerical identifier corresponding to a master key to be utilized), an/or an identifier of a method or algorithm (e.g., an advanced encryption standard, triple data encryption standard, etc.) that may be utilized to derive a master key or other key to unlock the device. In one example embodiment, the locking information may be included in one or more fields or portions of the CPLC data that are currently unused by a chip manufacturer or fabricator. Additionally, in certain embodiments, the locking information may be added to the CPLC data by the chip manufacturer.

Once the service provider (e.g., the trusted service manager, etc.) establishes a communications session with the device, such as a registration session, the CPLC data (and/or other data that includes locking information) may be provided by the device to the service provider. The service provider may process the received information in order to identify and/or derive a key that may be utilized to unlock the secure element. For example, a suitable master level key may be identified and/or derived. The service provider may then utilize the key to unlock the secure element. Once the secure element has been unlocked, the service provider may perform a wide variety of different key management and/or provisioning functions. For example, authentication keys and/or encryption keys may be driven to the device. As another example, any number of applications, such as an authentication application, may be provisioned to the secure element by the service provider.

Various embodiments of the disclosure utilize trusted service management functionality to facilitate integration between multiple service providers and multiple devices, such as multiple mobile devices operating on any number of carrier networks, each operated by a different mobile network operator ("MNO"). In certain embodiments, a trusted service manager ("TSM") may be a third party entity strategically positioned to provide device application provisioning services and integration functionality for provisioning device applications and associated end user data (e.g., encryption data, key information, etc.) to end users' devices, to provide device application-related lifecycle management services, to manage the many-to-many relationships between the multiple service providers and the MNOs operating the carrier networks, and/or to authenticate mobile devices during the processing of a wide variety of different requests and/or transactions. Although devices are described herein as mobile devices, the devices may include any number of other types of devices, such as tablet computers. Indeed, the devices may include any devices that are capable of including a secure element or smart chip.

Applications that can be provisioned on mobile devices (or other devices) via a TSM can be any software application provided by a service provider and operable with a mobile device. According to one embodiment, near field communication ("NFC") applications that enable subsequent transactions using NFC technology of the mobile device (e.g., radio frequency identification ("RFID")) are among those mobile device applications provided by service providers. However, as used herein, mobile device applications are not limited to NFC-based applications. Example mobile device applications may include, but are not limited to, open loop and closed loop payment applications (e.g., MasterCard® PayPass™, Visa payWave™, American Express® ExpressPay, Discover® ZIP, NXP Mifare®, etc.), transit payment applications, loyalty applications, membership applications, electronic promotion and incentive applications, ticketing applications, access control and security applications, entertainment applications, retail shopping applications, and the like.

In addition to providing integration and mobile device application provisioning functionality, a TSM may be further operable to provide additional features and functionality associated with each application provisioned and with each service provider, MNO, and/or mobile device end user relationship. Example additional features that a TSM may provide include, but are not limited to, application lifecycle management (e.g., load, personalize, lock, unlock, terminate, etc.), secure element lifecycle management (e.g., lock, unlock, terminate, etc.), workflow management (e.g., new handset, exchanged handset, damaged handset, lost handset, stolen handset, closed MNO account, closed service provider account, etc.), secure element data preparation and application personalization, MNO customer service, service provider customer service, over the air ("OTA") provisioning, secured key management, end user authentication, MNO-based end user registration, carrier network-based end user registration, service provider-based end user registration, interactive voice response-based ("IVR-based") end user registration, live end user registration, and the like. It is appreciated that the aforementioned additional TSM features and functionality are provided for illustrative purposes only, and that any number of features and functionality may be provided by the TSM to service providers, MNOs, and/or end users in association with the application provisioning services and functionality.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

FIG. 1 represents a block diagram of an example system 100 for providing trusted service management functionality, according to one embodiment of the disclosure. As shown in FIG. 1, a trusted service manager ("TSM") computer 110; multiple mobile network operator ("MNO") computers 140a, 140b; multiple mobile devices 150a, 150b; and multiple service provider computers 160a, 160b may be in communication via at least one network 170 and/or multiple carrier networks 180a, 180b, each of the carrier networks 180a, 180b being associated with a respective MNO computer 140a, 140b. Each of these components will now be discussed in further detail.

First, the TSM computer 110 may include any number of processor-driven devices, including but not limited to, a server computer, a mainframe computer, one or more networked computers, a desktop computer, a personal computer, a laptop computer, a mobile computer, or any other processor-based device. In addition to having one or more processors 116, the TSM computer 110 may further include one or more memory devices 112, input/output ("I/O") interface(s) 118, and network interface(s) 119. The memory 112 may be any computer-readable medium, coupled to the processor(s) 116, such as RAM, ROM, and/or a removable storage device for storing data files and a database management system ("DBMS") to facilitate management of data files and other data stored in the memory 112 and/or stored in one or more separate databases 138. The memory 112 may also store various program modules, such as an operating system ("OS"), a service provider interface 121, a mobile network operator interface 122, an over the air provisioning services interface 123, an end user registration interface 124, a third party integrator interface 125, a secure element preparation module 126, a lifecycle management module 127, a workflow management module 128, a customer service module 129, an over the air provisioning module 130, an authentication module 131, and a services customization module 132. The OS may be, but is not limited to, Microsoft Windows®, Apple OSX™, Unix, a mainframe computer operating system (e.g., IBM z/OS, MVS, OS/390, etc.), or a specially designed operating system. Each of the interfaces and modules 121, 122, 123, 124, 125, 126, 127, 128, 129, 130, 131, 132 may comprise computer-executable program instructions or software, including a dedicated program, for receiving, storing, extracting, managing, processing, and analyzing transactions associated with application provisioning, lifecycle management, and/or authentication between multiple service provider computers 160a, 160b and multiple mobile devices 150a, 150b operating on multiple carrier networks 180a, 180b, each of which are operated by a different MNO computer 140a, 140b. The specific functions and operability of each of these interfaces and modules 121, 122, 123, 124, 125, 126, 127, 128, 129, 130, 131, 132 are described in greater detail below.

Still referring to the TSM computer 110, the I/O interface(s) 118 may facilitate communication between the processor 116 and various I/O devices, such as a keyboard, mouse, printer, microphone, speaker, monitor, bar code reader/scanner, RFID reader, or Hardware Security Modules ("HSMs") which facilitate secure key management and the like. With respect to HSMs, an HSM may be external, such as connected to the TSM computer 110 via a network, or internally or proximately connected to the TSM computer 110. The network interface(s) 119 may take any of a number of forms, such as, but not limited to, a network interface card, a modem, a wireless network card, a cellular network card, or any other means operable for facilitating communications with one or more carrier networks 180a, 180b and/or other networks 170. Indeed, the TSM computer 110 can communicate directly with mobile devices 150a, 150b via the carrier networks 180a, 180b, respectively, via network interface(s) 119 and/or via one or more of a service provider gateway 133, mobile network operator gateway 134, over the air services gateway 135, end user registration gateway 136, and third party integrator gateway 137. It will be appreciated that the TSM computer 110 may be implemented on a particular machine, which may include a computer that is designed, customized, configured, or programmed to perform at least one or more functions of the interfaces and modules 121, 122, 123, 124, 125, 126, 127, 128, 129, 130, 131, 132, according to an example embodiment of the disclosure.

Second, the MNO computers 140a, 140b may include any number of processor-driven devices, including but not limited to, a server computer, a mainframe computer, one or more networked computers, a desktop computer, a personal computer, a laptop computer, a mobile computer, or any other processor-based device. In addition to having one or more processors 146a, 146b, each of the MNO computers 140a, 140b may further include one or more memory devices 142a, 142b, input/output ("I/O") interface(s) 148a, 148b, and network interface(s) 149a, 149b. The memory 142a, 142b may be any computer-readable medium, coupled to the processor(s) 146, such as RAM, ROM, and/or a removable storage device for storing data files and a DBMS to facilitate management of data files and other data stored in the memory 142a, 142b and/or stored in one or more separate databases. The memory 142a, 142b may also store various program modules, such as an operating system ("OS"), a communications module 144a, 144b, and an authentication module 145a, 145b. The OS may be, but is not limited to, Microsoft Windows®, Apple OSX™, Unix, a mainframe computer operating system (e.g., IBM z/OS, MVS, OS/390, etc.), or a specially designed operating system. The communications module 144a, 144b may comprise computer-executable program instructions or software, including a dedicated program, for facilitating communications with multiple mobile devices 150a, 150b operating on the respective carrier networks 180a, 180b, and for facilitating mobile device application provisioning and management via a common MNO messaging standard as implemented by the TSM computer 110. The authentication module 145a, 145b may comprise computer-executable program instructions or software, including a dedicated program, for facilitating the authentication of mobile devices 150a, 150b and/or communications, as well as the establishment of secure communications channels with mobile devices 150a, 150b. A wide variety of authentication procedures may be utilized as desired by an authentication module 145a, 145b. In certain embodiments of the disclosure, an MNO computer 140a, 140b may authenticate a mobile device 150a, 150b and/or a communication in a similar manner as that described below for the TSM 110.

Still referring to each MNO computer 140a, 140b, the I/O interface(s) 148a, 148b may facilitate communication between the processors 146a, 146b and various I/O devices, such as a keyboard, mouse, printer, microphone, speaker, monitor, bar code reader/scanner, RFID reader, and the like. The network interface(s) 149a, 149b may take any of a number of forms, such as, but not limited to, a network interface card, a modem, a wireless network card, a cellular network card, or any other means operable for facilitating communications with one or more carrier networks 180a, 180b and/or other network 170. It will be appreciated that the MNO computers 140a, 140b may be implemented on a particular machine, which may include a computer that is designed, customized, configured, or programmed to perform at least one or more functions of the communications module 144a, 144b, according to an example embodiment of the disclosure.

Third, the mobile devices 150a, 150b may be any mobile processor-driven device, such as a mobile phone, radio, pager, laptop computer, handheld computer, PDA, and the like, or any other processor-based mobile device for facilitating communications over one or more carrier networks 180a, 180b. For example, each mobile device 150a, 150b may be registered with a specific MNO computer 140a, 140b for communicating via the respective carrier network 180a, 180b. In addition to having one or more processors 151a, 151b, each of the mobile devices 150a, 150b may further include one or more memory devices 152a, 152b, input/output ("I/O") interface(s) 158a, 158b, and network interface(s) 159a, 159b. The memory 152a, 152b may be any computer-readable medium, coupled to the processor(s) 151, such as RAM, ROM, and/or a removable storage device for storing data files. The memory 152a, 152b may also include secure elements 155a, 155b for maintaining mobile device applications and confidential data offered by one or more service providers 160, as may be provisioned via the TSM computer 110 and associated provisioning services. In certain embodiments, a secure element 155a, 155b may be configured to store a security module, authentication module, or other program utilized by a mobile device 150a, 150b to process communications received from other applications (e.g., a mobile wallet application 156a, 156b, etc.), add identification information (e.g., CPLC data, etc.) to communications, encrypt communications output by the mobile device 150a, 150b, decrypt communications received by the mobile device 150a, 150b, manage one or more shared secrets, and/or manage a wide variety of key information.

The memory 152a, 152b may also store any number of data files 153a, 153b and/or various program modules, such as an operating system ("OS"), end user interface module(s), a TSM provisioning module 154a, 154b (also referred to interchangeably herein as "TSM administration software"), and/or a mobile wallet 156a, 156b. The OS may be any mobile operating system, including proprietary operating systems by a mobile device manufacturer or mobile network operator, or third party software vendor mobile operating system, such as, but not limited to, Microsoft Windows CE®, Microsoft Windows Mobile®, Symbian OS™, Apple iPhone™ OS, RIM BlackBerry® OS, Palm OS® by ACCESS, or Google Android™. The mobile wallet 156a, 156b may be any suitable application that facilitates mobile payment and/or the completion of other mobile transactions utilizing the mobile device 150a, 150b. The TSM provisioning module 154a, 154b may comprise computer-executable program instructions or software, including a dedicated program, for facilitating mobile device application provisioning on general memory and/or on the secure elements 155a, 155b as carried out by the TSM computer 110. According to various embodiments, the secure elements 155a, 155b may refer to any computer-readable storage in the memory 152 and/or may refer to any securitized medium having memory, such as a Universal Integrated Circuit Card ("UICC"), Subscriber Identity Module ("SIM"), and the like. In one example, the secure elements 155a, 155b may be operable with a RFID device or other NFC device associated with the mobile devices 150a, 150b. It is also appreciated that the secure elements 155a, 155b may be a separate embedded secure element (e.g., smart card chip) or a separate element (e.g., removable memory card, a key fob; connected via Bluetooth, etc.). For example, a secure element chip may be embedded in a mobile device 150a, 150b separately from a general operation chip utilized by the mobile device 150a, 150b. In certain embodiments, the secure elements 155a, 155b may include any suitable hardware and/or software, such as memory, processing components, and communications components. In certain embodiments, the secure elements 155a, 155b may be configured to communicate with other elements of the mobile devices 150a, 150b, such as a general or shared memory chip associated with the mobile devices 150a, 150b. For example, a mobile wallet 156a, 156b may be stored in shared memory, and a secure element 155a, 155b may be accessed to encrypt and/or decrypt transactions and/or other messages generated by and/or received by the mobile wallet 156a, 156b.

Still referring to each mobile device 150a, 150b, the I/O interface(s) 158a, 158b may facilitate communication between the processors 151a, 151b and various I/O devices, such as a keypad, touch screen, keyboard, mouse, printer, microphone, speaker, screen display, RFID device, NFC device, and the like. The network interface(s) 159a, 159b may take any of a number of forms to permit wireless communications according to various communications standards, such as, but not limited to, Code Division Multiple Access ("CDMA"), Global System for Mobile Communication ("GSM"), Universal Wireless Communications ("UWC"), Universal Mobile Telecommunications System ("UMTS"), or General Packet Radio Service ("GPRS") communication standards as may be implemented by one or more carrier networks 180a, 180b. The network interfaces(s) 159a, 159b may further permit access to other networks 170, such as via one or more carrier networks 180a, 180b providing Internet or other network access, or via Wi-Fi communications onto a Wi-Fi network. It will be appreciated that the mobile devices 150a, 150b may be implemented on a particular machine, which may include a computer that is designed, customized, configured, or programmed to perform at least one or more functions of the TSM provisioning module 154a, 154b and other mobile communications, including voice communications, data communications, short message service ("SMS"), wireless application protocol ("WAP"), multimedia message service ("MMS"), Internet communications, other wireless communications, and the like, according to an example embodiment of the disclosure.

Although mobile devices 150a, 150b are described with reference to FIG. 1, it will be appreciated that other types of devices may be utilized in accordance with embodiments of the disclosure. Indeed, any device that is capable of including, incorporating, and/or being associated with a secure element may be utilized. Examples of suitable devices include, but are not limited to, tablet computers, personal computers, mobile transaction devices, etc. Additionally, any suitable communications networks may facilitate communication between a device and the TSM 110, such as a cellular network, a wide area network, the Internet, etc.

Fourth, the service provider ("SP") computers 160a, 160b may include any number of processor-driven devices, including but not limited to, a server computer, a mainframe computer, one or more networked computers, a desktop computer, a personal computer, a laptop computer, a mobile computer, or any other processor-based device. In addition to having one or more processors 166a, 166b, each of the service provider computers 160a, 160b may further include one or more memory devices 162a, 162b, input/output ("I/O") interface(s) 168a, 168b, and network interface(s) 169a, 169b. The memory 162a, 162b may be any computer-readable medium, coupled to the processor(s) 166, such as RAM, ROM, and/or a removable storage device for storing data files and a DBMS to facilitate management of data files and other data stored in the memory 162a, 162b and/or stored in one or more separate databases. The memory 162a, 162b may also store various program modules, such as an operating system ("OS") and a mobile device application module 164a, 164b. The OS may be, but is not limited to, Microsoft Windows®, Apple OSX™, Unix, a mainframe computer operating system (e.g., IBM z/OS, MVS, OS/390, etc.), or a specially designed operating system. The mobile device application module 164a, 164b may comprise computer-executable program instructions or software, including a dedicated program, for generating and/ or providing mobile device software applications for provisioning on multiple mobile devices 150a, 150b via a common service provider messaging standard as implemented by the TSM computer 110.

Still referring to each service provider computer 160a, 160b, the I/O interface(s) 168a, 168b may facilitate communication between the processors 166a, 166b and various I/O devices, such as a keyboard, mouse, printer, microphone, speaker, monitor, bar code reader/scanner, RFID reader, and the like. The network interface(s) 169a, 169b may take any of a number of forms, such as, but not limited to, a network interface card, a modem, a wireless network card, a cellular network card, or any other means operable for facilitating communications with the network 170. It will be appreciated that the service provider computer 160a, 160b may be implemented on a particular machine, which may include a computer that is designed, customized, configured, or programmed to perform at least one or more functions of the mobile device application module 164a, 164b, according to an example embodiment of the disclosure.

The network 170 may include any telecommunication and/ or data network, whether public, private, or a combination thereof, including a local area network, a wide area network, an intranet, an internet, the Internet, intermediate handheld data transfer devices, a publicly switched telephone network ("PSTN"), a cellular network, and/or any combination thereof and may be wired and/or wireless. The network 170 may also allow for real time, near real time, off-line, and/or batch transactions to be transmitted between or among the TSM computer 110, the MNO computer(s) 140a, 140b, the mobile devices 150a, 150b, and the service provider computers 160a, 160b. Due to network connectivity, various methodologies as described herein may be practiced in the context of distributed computing environments. It will also be appreciated that the network 170 may include a plurality of networks, each with devices such as gateways and routers for providing connectivity between or among networks 170. Instead of, or in addition to, a network 170, dedicated communication links may be used to connect the various devices in accordance with an example embodiment.

The mobile carrier networks 180a, 180b may include any cellular telecommunication network, each operated by a respective mobile network operator. The mobile carrier networks may be implemented to operate according to one or more wireless technology formats, including, but not limited to, CDMA, GSM, UWC, UMTS, GPRS, and/or any "generation" or version thereof. Accordingly, in one embodiment, each mobile device 150a, 150b is configured to operate primarily on a certain carrier network 180a, 180b as operated by the mobile network operator with which the mobile device end user has an agreement and with which the mobile device is registered. It is appreciated, however, that, according to various embodiments, mobile devices 150a, 150b and carrier networks 180a, 180b may be configured to permit interoperability of mobile devices on non-registered carrier networks 180a, 180b.

Generally, each of the memories and data storage devices, such as the memories 112, 142a, 142b, 152a, 152b, 162a, 162b and the databases 138, and/or any other memory and data storage device, can store data and information for subsequent retrieval. In this manner, the system 100 can store various received or collected information in memory or a database associated with one or more of the TSM computer(s) 110, the MNO computer(s) 140a, 140b, the mobile devices 150*a*, 150*b*, and/or the service provider computer(s) 160*a*, 160*b*. The memories and databases can be in communication with each other and/or other databases, such as a centralized database, or other types of data storage devices. When needed, data or information stored in a memory or a database may be transmitted to a centralized database capable of receiving data, information, or data records from more than one database or other data storage devices. In other embodiments, the databases shown can be integrated or distributed into any number of databases or other data storage devices.

Suitable processors, such as the processors 116, 146*a*, 146*b*, 151*a*, 151*b*, 166*a*, 166*b*, may comprise a microprocessor, an application-specific integrated circuit ("ASIC"), and/or state machine. Example processors can be those provided by Intel Corporation (Santa Clara, Calif.), AMD Corporation (Sunnyvale, Calif.), and Motorola Corporation (Schaumburg, Ill.). According to various embodiments, one or more of the computers can be configured as a multi-processor computer having multiple processors 116, 146*a*, 146*b*, 151*a*, 151*b*, 166*a*, 166*b* providing parallel and/or redundant processing capabilities. Such processors comprise, or may be in communication with, media, for example, computer-readable media, which stores instructions that, when executed by the processor, cause the processor to perform the elements described herein. Embodiments of computer-readable media include, but are not limited to, an electronic, optical, magnetic, or other storage or transmission device capable of providing a processor with computer-readable instructions. Other examples of suitable media include, but are not limited to, a floppy disk, pen drive, CD-ROM, DVD, magnetic disk, memory chip, ROM, RAM, EPROM, EEPROM, a configured processor, all optical media, all magnetic tape or other magnetic media, or any other medium from which a computer processor can read instructions. Also, various other forms of computer-readable media may transmit or carry instructions to a computer, including a router, gateway, private or public network, or other transmission device or channel, both wired and wireless. The instructions may comprise code from any computer-programming language, including but not limited to, assembly, C, C++, C#, Visual Basic, Java, Python, Perl, JavaScript, GPSS, LISP, SAS, Parlay, JAIN, or Open Mobile Architecture.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. In addition, the designation of system components by "a" and "b" is not intended to limit the number of possible components, but instead are provided for illustrative purposes to indicate that more than one of the respective components can be provided. Accordingly, embodiments of the disclosure should not be construed as being limited to any particular operating environment, system architecture, or device configuration.

Figure 2:
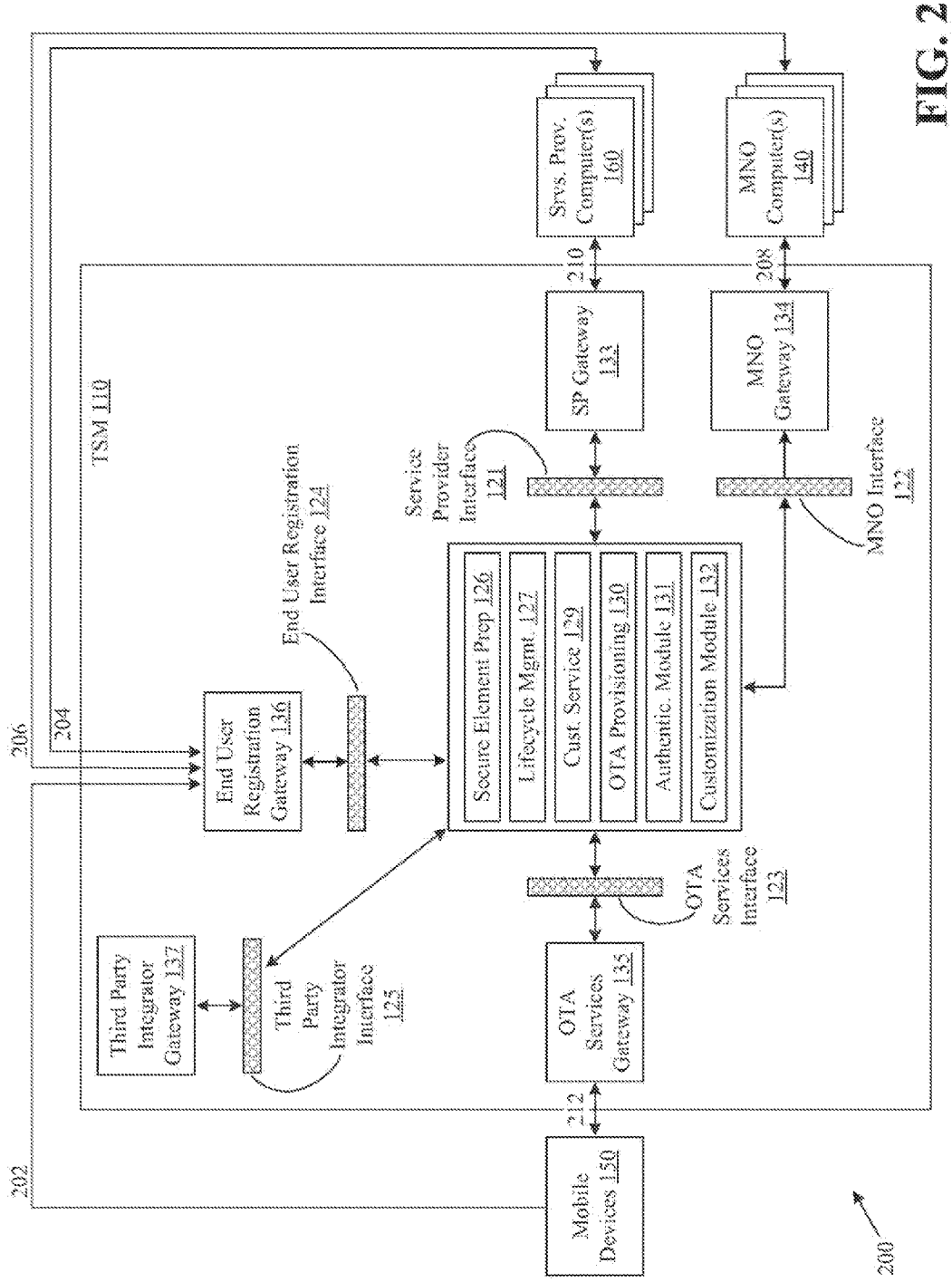
FIG. 2 illustrates a block diagram of an example trusted service management integration and associated data flow, according to an example embodiment of the disclosure.

FIG. 2 illustrates an example block diagram 200 illustrating data flow and integration points between the TSM computer 110 and the various other entities that may participate in mobile device application provisioning, integration, authentication, and maintenance, such as multiple service provider computers 160, multiple MNO computers 140, and multiple mobile devices 150, according to one embodiment of the disclosure. An example operation of the block diagram 200 of FIG. 2 will be described separately and in conjunction with the flow diagrams of FIGS. 3-5.

As generally described above, a TSM and associated TSM computer 110 may be operable to load, delete, and manage mobile device applications and associated end user data on mobile devices on behalf of multiple service providers. Additionally, the TSM computer 110 may be operable to facilitate the unlocking of mobile devices, the authentication of mobile devices and/or mobile device communications, as well as the provision of key information to mobile devices. According to various embodiments, the TSM computer 110 may be operable to provide, but is not limited to, one or more of the following functions: to act as a single point of integration between service providers, MNOs, and other TSMs; to unlock mobile devices; to load mobile device applications over the air to mobile devices; to accept, prepare and personalize mobile device application end user data; to allow service providers to interact with end users over one or more of the carrier networks for registration and communications; to enable a service provider to authenticate the end user requesting personalization of an application; to manage secured keys (e.g., cryptographic keys, master keys, rotated keys, symmetric keys, asymmetric keys, private keys, transaction specific keys, etc.) used for application provisioning, personalization, and/or authentication of mobile devices; to manage shared secrets for message authentication; to generate and/or validate message tags and/or codes; to manage mobile device application lifecycles on behalf of service providers over the life of an application; to manage mobile device lifecycles on behalf of MNOs over the life of a handset; and to provide billing and other administration functions to support relationships between MNOs and service providers, and between the TSM and each MNO and service provider.

Various services provided by the TSM computer 110 can be implemented by one or more of the following application modules: the secure element preparation module 126, the lifecycle management module 127, the workflow management module 128, the customer service module 129, the over the air provisioning module 130, the authentication module 131, and the services customization module 132.

The secure element preparation module 126 may be configured to facilitate preparing mobile device secure elements, such as requesting increased space allocated on the secure element for provisioning applications and verifying secure element properties with the MNO. According to various embodiments, the secure element preparation module 126 may further be configured to receive and/or provide personalization data associated with mobile device applications for each end user during provisioning. In one example, a service provider computer 160 may provide personalization data via the service provider gateway 133. As another example, the TSM computer 110 may generate personalization data via the secure element preparation module 126. As yet another example, the TSM computer 110 may coordinate application personalization and/or secure element preparation via one or more third entities.

In certain embodiments, the secure element preparation module 126 may be configured to "unlock" a secure element. For example, during the registration of a mobile device (or other device) with the TSM computer 110, secure element information (e.g., CPLC data, etc.) may be communicated to the TSM computer 110 and/or processed by the secure element preparation module 126. For example, CPLC data may include an identifier of a secure element fabricator and/or information associated with a method utilized to derive a master key. Based at least in part upon an analysis and/or evaluation of the secure element information, the secure element preparation module 126 may identify and/or derive a key (e.g., a master key, etc.) that may be utilized to unlock the secure element. The secure element preparation module 126 may then utilize a derived key to "unlock" the secure element. Following the unlocking of the secure element, a wide variety of applications and/or other data may be provisioned to the mobile device.

One example of the operations that may be performed by the secure element preparation module 126 to facilitate the unlocking of a secure element is described in greater detail below with reference to FIG. 5.

The lifecycle management module 127 may be configured to facilitate tracking the status of users' mobile devices and the status of previously provisioned applications. For example, the lifecycle management module 127 may be configured to maintain inventories of various types of mobile devices, associated secure elements and the state of the secure elements and applications (active, locked, unlocked, terminated), which may be used to track the status of applications and mobile devices, and to communicate with MNOs and/or service providers regarding the provisioned applications, the mobile devices, the end user, etc. In addition, the lifecycle management module 127 may be configured to coordinate initial application requests, application personalization, secure element preparation, and provisioning; coordinate any third party entities participating in the provisioning process; maintain statuses; and facilitate billing and payment (e.g., MNO fees, service provider payments, etc.).

The workflow management module 128 may be configured to maintain and manage the workflow of events between MNOs and service providers. For example, when the MNO reports a lost or stolen handset to the TSM, the TSM may trigger a series of events to the service providers to prevent fraudulent transactions. In turn, the workflow management module 128, based on service provider rules, may instruct the lifecycle management module to send one or more commands to the mobile device to lock or terminate applications.

The customer service module 129 may be configured to receive and respond to customer service requests, including those from end users, service providers, and/or MNOs. According to one embodiment, the TSM computer 110 and associated customer service module 129 may provide triage and management functions between the various responsible entities (e.g., service providers and MNOs), and/or provide initial or more involved levels of customer service.

The over the air provisioning module 130 may be configured to facilitate the OTA provisioning of mobile device applications and associated end user data with multiple mobile devices. As described in more detail herein, the OTA provisioning module 130 may facilitate communications with third party OTA provisioning providers via the OTA services gateway 135, and/or can facilitate direct provisioning by the TSM computer 110. It is appreciated that, according to some embodiments, the functions of the OTA provisioning module 130 may also be implemented in one or more of the MNO computers 140 and/or within functions implemented by the carrier networks 180*a*, 180*b*, either instead of, or in combination with, those provided in the TSM computer via the OTA provisioning module 130.

The authentication module 131 may be configured to provide administration and maintenance functions for shared secrets and/or secured keys (e.g., cryptographic keys, master keys, public keys, private keys, symmetric keys, asymmetric keys, etc.) in accordance with TSM security policies, MNO security policies, and/or service provider security policies. Additionally, the authentication module 131 may be configured to utilize message tags and/or codes to process both outgoing and received communications or messages. Various functions performed by the TSM computer 110 may integrate with the authentication module 131 to provide security for end users, MNOs, and service providers in association with each of the TSM services. In certain embodiments of the disclosure, the authentication module 131 may be configured to perform a wide variety of secure key provisioning and/or secure key rotation techniques for various mobile devices 150.

The services customization module 132 may be configured to facilitate customization and selection of services offered by the TSM to each service provider and MNO. As is apparent by that described and illustrated herein, the TSM computer 110 may be configured to provide a variety of features and functions associated with mobile device application provisioning and integration between the service providers and MNOs. Accordingly, due at least in part to the simplified common interfaces and gateways (e.g., MNO gateway 134 and MNO interface 122, service provider gateway 133 and service provider interface 121, etc.), the TSM computer 110 may permit each service provider and MNO to customize from the services available. The services customization module 132 may be configured to include computer-executable program logic to generate an interface for selecting and customizing TSM services, and to coordinate the implementation by other TSM application modules. For example, a first service provider may opt to only provide mobile device applications to mobile devices operating on certain carrier networks, while a second service provider may opt to provide mobile device applications to all mobile devices irrespective of the associated carrier networks. As another example, a service provider may request the TSM computer 110 to provide end user registration functionality on behalf of the service provider, while a second service provider provides its own registration services and integrates via the end user registration gateway 136 and associated end user registration interface 124. Accordingly, the customization module may permit coordinating and implementing the appropriate combination of features and integration points as requested by service providers and MNOs. It is appreciated that any combination of features and integration points may be provided by the TSM computer 110, and that these are provided for illustrative purposes only. In one implementation, the customizations provided may be driven at least in part by contractual relationships between the TSM and respective service providers and MNOs, such that the TSM may also support and/or enforce these contractual agreements as part of the features of the services customization module 132.

The MNOs and associated MNO computers 140 may be operable to provide the communications channel to reach and provision mobile device applications and associated end user data on end users' mobile devices. According to various embodiments, each MNO computer 140 may be operable to provide, but is not limited to, one or more of the following functions: provide the TSM computer with information on mobile device secure elements and unique mobile device identity modules (e.g., Universal Subscriber Identity Modules ("USIMs")) throughout the lifecycle; provide a communications gateway via a respective carrier network for OTA provisioning of mobile device applications; provide a mobile device user interface for accessing provisioned mobile device applications on each mobile device (e.g., a mobile wallet); facilitate management of secured keys used to securely load and delete mobile device applications on mobile device secure elements; interface with the TSM computer; facilitate authentication of the end user interfacing with the TSM; facilitate allocating memory for mobile device applications on the end users' mobile devices; communicate to the TSM computer that unique end user identity modules have changed; communicate to the TSM computer the status of unique mobile device identity modules (e.g., which USIMs have been lost, stolen, damaged, replaced by new mobile devices, etc.); and facilitate management of any tariffs and fees associated with application provisioning communications.

An MNO gateway 134 and associated MNO interface 122 are operable for providing a common point of integration between the TSM computer 110 and the multiple MNO computers 140. According to one embodiment, the MNO interface 122 is configured to communicate with each MNO according to the same common MNO message standard, as described further herein. Moreover, according to various embodiments, the MNO gateway 134 and associated MNO interface 122 are further operable to permit the TSM computer 110 to communicate with mobile devices 150 via a respective carrier network operated by each MNO.

The service providers and associated service provider computers 160 are operable to provide one or more services in which mobile device end users participate (e.g., financial services, membership services, loyalty account services, etc.). Accordingly, the service providers represent the entities that generate and/or provide mobile device applications associated with these services that are provisioned via the TSM computer 110 on end users' mobile devices. A service provider generating and providing the mobile device applications may be the same service provider that operates the underlying service, or may be a service provider providing the mobile device applications on behalf of another service provider operating the underlying service. According to various embodiments, each service provider computer 160 may be operable to provide, but is not limited to, one or more of the following functions: supply a mobile device application for loading onto the mobile devices of its end users (e.g., customers of the service provider); request the use of and/or provisioning of TSM-created soft-card applications (e.g., electronic application permitting payment or other features that can be used in association with participating service provider transactions); facilitate end user authentication processes and associated information; facilitate the creation and maintenance of end user application accounts (e.g., financial account if the service provider is a financial institution or payment processor, membership or loyalty account if the service provider is a retailer or other merchant, etc.); provide end user support for their provisioned mobile device applications; receive application messages from mobile devices returned via one or more of the carrier networks; facilitate processing contactless transactions associated with the provisioned mobile device applications (e.g., a payment transaction at a retailer, etc.); facilitate management and maintenance of application-related secured keys and share these keys with the TSM computer; and facilitate mobile device application personalization and/or coordinate with TSM to prepare personalization data.

A service provider gateway 133 and associated service provider interface 121 are operable for providing a common point of integration between the TSM computer 110 and the multiple service provider computers 160. According to one embodiment, the service provider interface 121 is configured to communicate with each service provider according to the same common service provider messaging standard, as described further herein.

The mobile devices 150 represent the respective end users that have contractual relationships with the MNOs (e.g., for operating on a respective carrier network) and with the service providers (e.g., for participating in one or more services offered by the service providers). Accordingly, end users may utilize the mobile devices 150 to register for, request, and activate mobile device applications from service providers via the TSM computer 110. According to various embodiments, each mobile device 150 may be operable to provide, but is not limited to, one or more of the following functions: activate mobile devices and/or secure elements with an MNO; register for and request mobile device applications from a service provider (or agent of the service provider) or from an MNO; download mobile device applications and associated end user data on mobile device secure elements; authenticate the respective end user and/or mobile device to the service provider to permit application personalization; activate applications with the respective service providers; generate tags for association with output communications; evaluate and/or validate received communications; perform transactions using the provisioned mobile device applications (e.g., a payment transaction at a retailer, etc.); initiate customer service requests (e.g., with the respective MNO, with service providers, with the TSM, with other third party entities, etc.); notify the respective MNO of a new mobile device and/or secure element; and alter end user settings associated with provisioned mobile device applications (e.g., change or reset a PIN, cancel a mobile device application, cancel an MNO relationship, etc.).

An OTA services gateway 135 and associated OTA services interface 123 are operable to facilitate provisioning of mobile device applications and associated end user data to end users' mobile devices 150. According to one embodiment, the OTA services gateway 135 may be configured to permit the TSM computer 110 to transact with third party OTA provisioning providers to perform all or some of the OTA provisioning services with mobile devices 150, such as by utilizing a common provisioning messaging standard for all third party OTA provisioning providers in a manner similar to that described with reference to the MNO interface 122 and service provider interface 121. According to another embodiment, the OTA services gateway 135 may be configured to permit the TSM computer 110 to provision mobile device applications and associated end user data directly to the mobile devices 150, such as via one or more carrier networks. According to various embodiments, the MNO gateway 134 and associated MNO interface 122 may be utilized at least in part to provide OTA provisioning by the TSM computer 110, such as for accessing and communicating over a respective MNO carrier network.

An end user registration gateway 136 and associated end user registration interface 124 are operable to facilitate communications with mobile device end users for registering to receive mobile device applications, requesting mobile device applications, updating status on mobile devices 150 and/or provisioned applications, and the like. According to one embodiment, service provider computers 160 and/or MNO computers 140 provide registration applications for end users (e.g., mobile device-based registration interface, Internet-based registration interface, etc.). Thus, the end user registration gateway 136 and associated end user registration interface 124 provide a common integration point and associated common messaging standard for receiving and responding to such requests in a manner similar to that described with reference to the MNO interface 122 and service provider interface 121. According to another embodiment, the TSM computer 110 may be configured to provide similar registration services to mobile device end users, such as may be performed on behalf of the service providers or MNOs. According to various embodiments, the MNO gateway 134 and associated MNO interface 122 may be utilized at least in part to provide end user registration functions by the TSM computer 110, such as for transmitting and receiving registration data over a respective MNO carrier network. According to various embodiments, the service provider gateway 133 and associated service provider interface 121 may be utilized at least in part to provide end user registration functions by the TSM computer 110, such as for end user authentication.

A third party integrator gateway 137 and associated third party integrator interface 125 are operable to facilitate communications with one or more third party integrators, such as may occur when sharing responsibilities or otherwise communicating with other TSMs. Much like that described with reference to the MNO interface 122, MNO gateway 134, service provider interface 121, and service provider gateway 133, the third party integrator gateway 137 and associated third party integrator interface 125 provide a common integration point and associated common messaging standard for communicating with any third party integrators.

Figure 3:
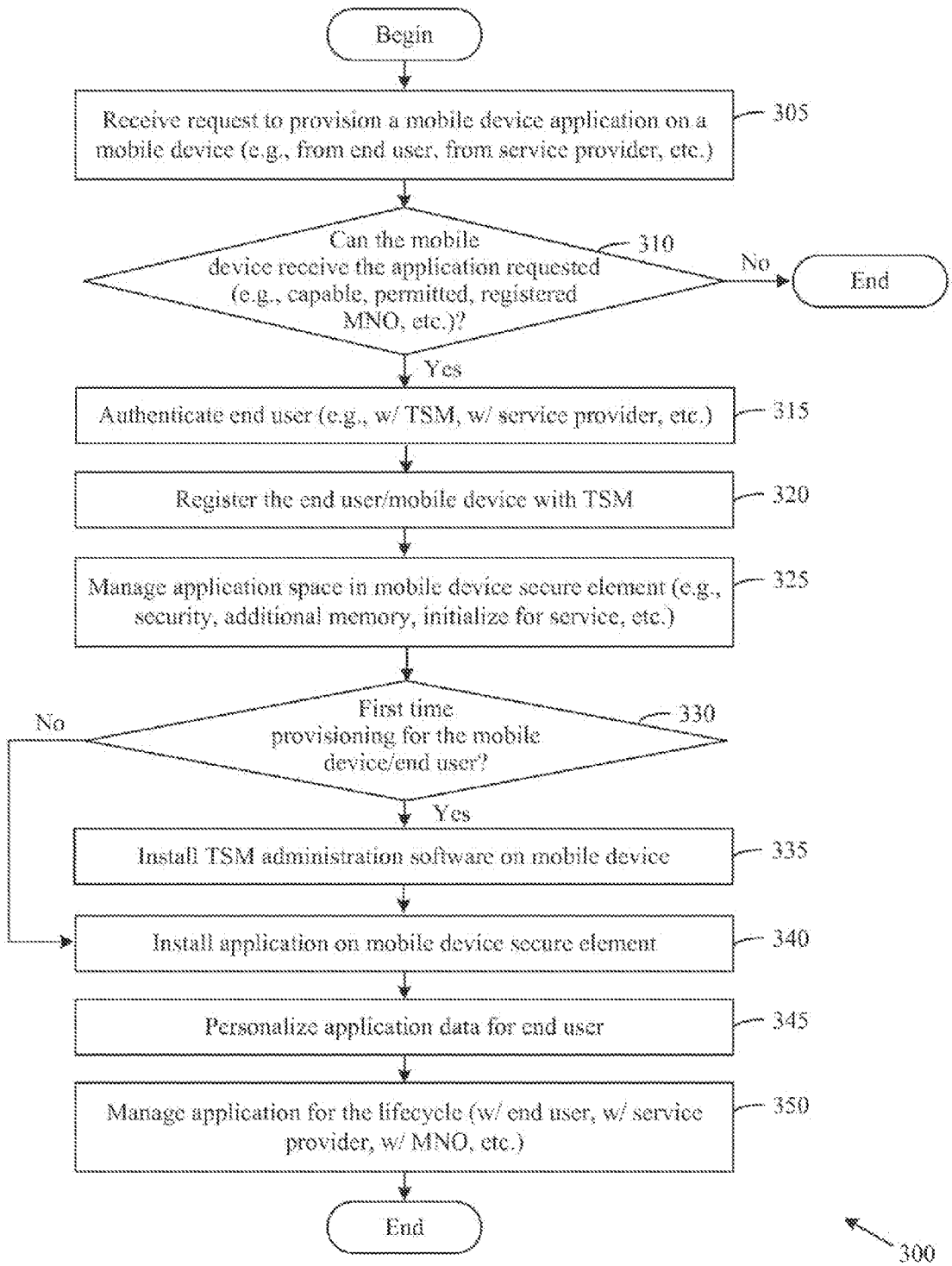
FIG. 3 illustrates a flow diagram of an example process for provisioning a device application, according to an example embodiment of the disclosure.

With reference to FIG. 3, a flow diagram is provided illustrating an example method 300 for providing a mobile device application by a TSM computer 110, according to one embodiment. The method 300 is described also with reference to the block diagram 200 of FIG. 2.

By example only, the steps illustrated and described with reference to FIG. 3 can be performed to facilitate the provisioning of any mobile device application, such as an application that facilitates the encryption of messages and/or communications and/or a near field communication ("NFC") payment application provided by a payment service provider (e.g., card account issuer, financial institution, etc.). A mobile device user would request the installation of a desired application on an associated mobile device from either the TSM or directly from a service provider providing the NFC payment application. The request ultimately would be transmitted to the TSM, such as via the end user registration gateway 136 and end user registration interface 124 if coming directly from the end user, or via the service provider gateway 133 and the service provider interface 121 if coming via a service provider. Upon receiving the request, the TSM computer then may verify whether the end user's mobile device is capable of receiving installs, whether a secure element associated with the end user's mobile device is adequately configured (e.g., can support an install, sufficient space, etc.). The TSM computer may then perform the necessary steps to prepare the end user's mobile device and associated secure element, either directly and/or via the end user's mobile network operator. In addition, the TSM may perform the various authentication measures to verify the end user, the end user's mobile device, and set up and personalize the requested application for installation on the end user's secure element. After the requested application is personalized and authentication and security measures are in place at the TSM computer, the application may be provisioned to the end user's mobile device, such as via the OTA services gateway 135 and the OTA services interface 123 and/or via the MNO gateway 134 and the MNO interface 122 for interfacing with the end user's mobile network operator. After provisioning, the lifecycle of the application for that end user may be managed via the TSM computer, such as via the lifecycle management application 127. Various services can be provided and/or otherwise facilitated by the TSM computer, such as handling service requests from the end user, the MNO, and the service provider; coordinating billing between the MNO and the service provider; facilitating updates to the application; and any other communications that may be required between the MNO, the service provider, the end user's mobile device, and/or the end user. It is appreciated that this description of provisioning and servicing an application is provided for illustrative purposes, and the methods described with reference to FIG. 3 may be performed for any type of mobile device application between any of a number of parties.

The method 300 may begin at block 305, in which the TSM computer receives a request to provision a mobile device application on a mobile device. According to various embodiments, a provisioning request may come from any of the mobile devices 150 or associated end users, service provider computers 160, MNO computers 140, or associated websites or other network-routed requests. For example, a mobile device end user may transmit a registration request for a certain mobile device application as part of an end user communication 202, whereby the request is received via the end user registration gateway 136. In another example, a service provider registration request 204 is transmitted from a service provider to the end user registration gateway 136 according to a common service provider messaging standard, such as may occur when an end user requests an application via a service provider or when a new application version of a previously provisioned application is available. In yet another example, an MNO registration request 206 is transmitted from the MNO computer 140 to the end user registration gateway 136 according to a common MNO messaging standard, such as may occur if an MNO provides application registration and requests features on behalf of one or more service providers.

Following block 305, operations may continue at block 310. At decision block 310, a determination may be made as to whether the mobile device 150 is capable and/or is permitted to receive an OTA provisioned application. For example, it may be determined whether the mobile device is technically capable of receiving an OTA provisioned application or capable of operating the specific application requested, whether enough memory is available, etc., which may be obtained from the MNO computer 140 via the MNO gateway 134 utilizing MNO communications 208. In another example, it may be determined whether the mobile device and end user are permitted to receive the application requested, such as whether the end user's contract with the MNO or the service provider permits installation and/or use of the application, which may be obtained from the MNO computer 140 by MNO communications 208 sent via the MNO gateway 134 or from the service provider computer 160 by service provider communications 210 sent via the service provider gateway 133, respectively. It is appreciated that any other factor may be considered when determining whether the mobile device can receive the application at decision block 310, as may be desired.

If it is determined at block 310 that the mobile device cannot receive the mobile device application requested, then the method 300 may end. According to various embodiments, the TSM computer 110 may be configured to transmit a failure or status update to the mobile device, end user, MNO, service provider, and/or any other entity or individual. If, however, it is determined at block 310 that the mobile device may receive the mobile device application requested, then operations may continue at block 315.

At block 315, the TSM computer 110 may perform authentication processing of the end user and/or the end user's mobile device. For example, the identity of the mobile device end user may be verified as the correct end user for receiving the mobile device application and/or associated personalization data, and/or that the mobile device is in the correct end user's possession. According to one embodiment, the TSM computer 110 is operable to at least partially perform end user authentication, such as by receiving end user authentication data as part of an end user communication 202 and processing the end user authentication data against service provider provided authentication data and/or TSM stored authentication data. However, according to other embodiments, the respective service provider can authenticate customers directly via the service provider computer 160. According to yet another embodiment, a combination of the TSM computer 110 and the service provider computer 160 may perform end user authentication, such as by receiving authentication data as part of the end user communication data 202 directly via the end user registration gateway 136, processing the authentication data in part by the TSM computer 110, and communicating authentication data and responses with the service provider computer 160 by the service provider communications 210 sent via the service provider gateway 133, according to the common service provider messaging standard. If it is determined that the end user is not authenticated, then the method 300 may terminate, or may re-attempt authentication.

If the end user is authenticated at block 315, then block 320 follows. At block 320, the end user and/or the mobile device is registered with the TSM, because it was previously determined at block 310 that the mobile device and/or the user has not yet received an application via the TSM. According to various embodiments, as part of the registration process, the TSM computer 110 may be configured to store unique identifiers of the mobile device, its secure element, and/or the end users for subsequent processing. For example, according to one embodiment, the TSM computer 110 may store a Mobile Subscriber Integrated Services Digital Network Number ("MSISDN"), Integrated Circuit Card ID ("ICCID"), an International Mobile Subscriber Identity ("IMSI"), and/or card production life cycle ("CPLC") information to uniquely identify the end user and associated mobile device. According to other embodiments, however, any unique identifier may be used, such as may be provided by the end user or by the MNO.

Following block 320 is block 325, in which the TSM computer 110 facilitates the management of the application space on the mobile device secure element or other memory device associated with the mobile device. As part of this process, additional space may be provisioned via the MNO, secured keys may be provided (e.g., by the TSM or by the MNO), privileges associated with the secure element (or other memory device) may be added or changed, and/or the mobile device may be initialized for utilizing the mobile device application (e.g., initialized for NFC transactions, etc.). It is appreciated that various other steps may be performed as part of preparing the secure element for provisioning the requested application. According to various embodiments, some or all of these steps are initiated by the TSM computer 110 but performed at least in part by an MNO computer 140 communicating directly with the mobile device (e.g., via wireless communications over the respective carrier network, via Internet-based communications, etc.). Though, according to other embodiments, the TSM computer 110 and the associated secure element preparation module 126 and/or OTA provisioning module 130 are operable to facilitate preparing and managing the application space on the mobile device secure element at block 325 via OTA communications 212 from the TSM computer 110 to the mobile device 150 via the OTA services gateway 135 (which, according to various embodiments, may also utilize the MNO gateway 134).

Following block 325 is decision block 330, in which a determination may be made as to whether the mobile device and/or end user associated with the mobile device has previously received a mobile device application via the TSM computer 110. If the TSM computer 110 has previously provisioned an application on the mobile device, then it may be assumed that the end user and/or mobile device is registered with the TSM, has TSM administration software installed, and is capable of OTA application installations. However, if the mobile device has not yet participated in OTA provisioning via the TSM computer, then additional steps may be performed to validate the capabilities and permissions to receive the application. If it is determined at block 330 that the mobile device and/or the end user has previously received a mobile device application via the TSM computer, then operations may continue at block 335 described below.

If, however, it is determined at block 330 that the mobile device and/or the end user has not previously received a mobile device application via the TSM computer, then operations may continue at block 340, and the TSM computer 110 may install TSM administration software on the mobile device 150 that may be utilized to provide secured access to secure elements and further facilitate installing, accessing, and operating TSM-provisioned applications. The TSM computer 110 may install the TSM administration software on the mobile device also by OTA communications 212 sent via the OTA services gateway 135. It is appreciated that, according to another embodiment, a third party OTA provisioning provider may perform some or all of the application installation functions. In another embodiment, the MNO may generate and/or provide TSM administration software capable of accessing and operating TSM-provisioned applications. In one embodiment, the TSM administration software may be utilized to install, access, and operate all mobile device applications provided by all service providers. Though, in another embodiment, multiple administration software applications may be required, such as may occur when certain service provider applications require specialized administration software.

Following block 335 is block 340, in which the requested application may be installed on the secure element (or other memory device) of the mobile device 150. According to one embodiment, the requested application is installed by the TSM computer 110 by communicating directly with the mobile device via the OTA services interface 123 by transmitting application data in the OTA messaging according to the standard required by the specific secure element, mobile device, and/or carrier network technology, such as via Wireless Application Protocol ("WAP"), Short Messaging Service ("SMS"), Multimedia Messaging Service ("MMS"), etc. It is appreciated that, while each of the gateways and associated interfaces described herein are designed to promote a common integration point and common messaging standards to simplify integration and system flexibility, various mobile devices and carrier networks may operate according to a number of wireless technologies, each of which may cause application provisioning processing to be performed differently according to each of the various wireless network technologies. According to another embodiment, however, instead of the TSM computer 110 provisioning the requested application, a third party OTA provisioning provider may perform some or all of the application installation functions. According to this embodiment, the OTA services gateway 135 and associated OTA services interface 123 can be configured to implement a common provisioning messaging standard for communicating with each of the possible third party OTA provisioning providers.

Following block 340 is block 345, in which personalization data associated with the requested mobile device application may be prepared and transmitted to the mobile device. According to one embodiment, personalization data may be generated by the TSM computer 110 from data supplied by the service provider computer 160 via service provider communications 210 in the common service provider messaging format. According to other embodiments, personalization data may be created by the TSM computer 110 based on stored data, or created by a third party entity for providing personalization data. The format and content of personalization data can vary, depending on the mobile device application to be provisioned. Moreover, it is further appreciated that, according to another embodiment, the personalization application data or other associated end user data can be transmitted at or near the same time as the application is provisioned on the mobile device at block 340.

Following block 345 is block 350, in which the TSM computer 110 is operable to manage the provisioned application during its lifetime as installed on the secure element associated with the mobile device 150. For example, as an application is installed at block 340, the TSM computer 110 may be operable to record application installation status, including successes and failures, as may be provided by the lifecycle management module 127. The TSM computer 110 and associated lifecycle management module 127 may thus be configured to track statuses associated with the provisioned application, such as may be utilized to respond to various service provider or MNO requests, to provide periodic updates to service providers and/or MNOs, or to facilitate billing and payment functions. Application status messages can be transmitted as MNO communications 208 via the MNO gateway 134 and/or as service provider communications 210 via the service provider gateway 133, each according to the common MNO and service provider messaging standards, respectively.

In one example, in response to a request from a service provider computer 160 regarding a specific end user (e.g., as identified by name, account, or other unique identifier), the TSM computer 110 is operable to identify the end user as having a TSM-provisioned application installed. The TSM computer 110 may identify the end user by a secure element identifier (e.g., the ICCID, IMSI, etc. associated with the secure element). The mobile phone number (i.e., MSISDN) may be used as a secondary identifier of the end user. Upon identifying the end user, the TSM computer may perform one or more of, but not be limited to, the following functions when managing the application lifecycle: check the application state on an end user mobile device and/or secure element; update an application version on an end user mobile device and/or secure element; lock or unlock an application on an end user mobile device or secure element; remove an application from an end user mobile device or secure element; process a request indicating that the mobile device and/or secure element is lost or stolen; update a customer phone number and mobile device; update a secure element identity (e.g., ICCID); update an end user's authentication data; process an MNO subscriber cancellation; process a service provider end user cancellation; process application service messages; send an end user and/or mobile device MNO or service provider messages; or lock or unlock one or more of the provisioned applications.

The method 300 may end after block 350, having facilitated the provisioning of mobile device applications and integrating multiple service providers with multiple MNOs and their registered mobile devices, by providing a trusted service manager that promotes simplified integration via common gateways and interfaces implementing common messaging standards.

According to an aspect of the disclosure, a service provider, such as the TSM computer 110, may identify customers by secure element rather than by device identifiers (e.g., a mobile device identifier, etc.). In this regard, customers may be identified in the event that identifying information for a device (e.g., a MSISDN, an IMEI/MEID, etc.) is not available. Additionally, customers may be identified in the event that a secure element is moved from one device to another device. FIG. 4 illustrates a flow diagram of an example method 400 for identifying a device or secure element by a trusted service manager, according to an example embodiment of the disclosure. The method 400 may be performed by a suitable trusted service management system, such as the system 100 illustrated in FIG. 1. The method 400 may begin at block 405.

At block 405, which may be optional in certain embodiments of the disclosure, a message may be generated by a device application, such as a mobile device wallet application 156. As desired, the message may include a wide variety of information, such as transaction information and/or information associated with an intended recipient. Once the message has been generated, operations may continue at block 410, and the device application may provide the generated message to an application stored on a secure element of the device.

The secure element application may receive the message from the device application at block 415. At block 420, the secure element application may add secure element identification information to the message. A wide variety of secure element identification information may be added to, appended to, and/or otherwise associated with the message as desired in various embodiments of the disclosure. For example, at least a portion of CPLC information associated with the secure element may be added to the message. As one example, a manufacturer identifier and/or a chip serial number included in the CPLC information may be added to the message for secure element identification purposes. CPLC information may include variable length data associated with any integrated circuit ("IC") incorporated into a device, such as a secure element chip and/or a subscriber identity module ("SIM") card. A wide variety of information may be included in CPLC data, including but not limited to, an identifier of an IC fabricator (e.g., a manufacturer), an IC type, an operating system identifier, an operating system release date, an operating system release level, an IC fabrication date, an IC serial number, an IC batch identifier, an IC module fabricator, an IC module packaging date, an IC manufacturer, an IC embedding date, an IC pre-personalizer identification, an IC pre-personalizer equipment date, an IC pre-personalizer equipment identifier, an IC personalizer identifier, an IC personalization date, and/or an IC personalization equipment identifier. In certain embodiments, CPLC data may be provided by a chip and/or a mobile device as a tag or data string.

At block 425, which may be optional in certain embodiments of the disclosure, the secure element application may encrypt the message. For example, in certain embodiments, the secure element application may identify an intended recipient for the message, such as the TSM or another intended recipient. In other embodiments, it may be assumed that a common recipient will ultimately receive all messages processed by the secure element, and no identification will be performed. An encryption technique and/or encryption method may be identified for use with the message. In certain embodiments, the identity of the intended recipient may be utilized to determine an encryption technique. For example, a shared secret and/or encryption key information may be identified based upon the identity of the intended recipient. The message may then be encrypted utilizing a wide variety of different encryption techniques. For example, a symmetric key, an asymmetric key, or a dynamic unique key per transaction key may be utilized to encrypt the message. As a result of the encryption, the security associated with the message may be enhanced. Additionally, because the encryption is performed by the secure element, the danger of a security breach or a security attack by another application having access to the shared memory of the mobile device may be reduced. In certain embodiments of the disclosure, one or more tags may be added to, appended to, or otherwise associated with the message. For example, a message authentication code ("MAC") or payload authentication code ("PAC") may be appended to the message to facilitate message validation by the intended recipient.

At block 430, the message may be returned by the secure element application to the device application. The device application may receive the message at block 435, and the device application may direct communication of the message to the intended recipient (e.g., the TSM, etc.) at block 440. Although the secure element is described as processing messages received from other device applications, such as applications stored on a shared memory of the device, the secure element may additionally or alternatively be configured to generate messages and direct the communication of messages to an intended recipient.

At block 445, a recipient of the message, which will be described as the TSM computer 110, may receive the message from the device. The TSM computer 110 may evaluate the message at block 450 in order to identify the secure element associated with the device. For example, CPLC information associated with the message may be identified, and the CPLC information may be processed in order to identify the secure element and/or a customer associated with the secure element. For example, the secure element may be identified by a chip serial number and/or a chip manufacturer. Additionally, at least a portion of the secure element information may optionally be utilized to access a database of stored customer information in order to identify a customer associated with the secure element. In certain embodiments, a device associated with the secure element may optionally be identified at block 455. For example, a device identifier included in the message may be identified. As another example, the secure element information may be utilized to access device information. As a result, a determination may optionally be made as to whether the secure element is being utilized in conjunction with an expected device.

Following the identification of the secure element and/or the device, operations may continue at block 460, and the message may be processed by the TSM computer 110. For example, the message may be decrypted by the TSM computer 110 utilizing a wide variety of shared secret and/or key information. As another example, the message may be processed to fulfill a desired request, such as a transaction request or a provisioning request.

The method 400 may end following block 460.

In certain embodiments of the disclosure, a TSM or other service provider may facilitate the unlocking of a secure element associated with a device, such as a mobile device. According to an aspect of the disclosure, information associated with the locking of the secure element may be included in CPLC data that is communicated to the TSM. The TSM will process the received CPLC data in order to identify or derive a key that may be utilized to unlock the secure element. The secure element may then be unlocked, thereby facilitating use of the secure element by the mobile device and/or the provisioning of additional applications and/or data (e.g., account information, etc.) to the secure element. For example, an authentication application that facilitates encryption and decryption of mobile device messages and/or communications may be provisioned to the secure element following the unlocking FIG. 5 illustrates a flow diagram of an example method 500 for unlocking a secure element, according to an example embodiment of the disclosure. The method 500 may be performed by a suitable trusted service management system, such as the system 100 illustrated in FIG. 1. The method 500 may begin at block 505.

At block 505, a user may activate a mobile device (or other device), such as one of the mobile devices 150 illustrated in FIG. 1. In certain embodiments, the activation of the mobile device 150 may be an initial activation of the mobile device 150. In other embodiments, the activation of the mobile device 150 may be an activation following the association of a new secure element with the mobile device 150 (e.g., the insertion of a new secure chip, etc.). Based upon an activation of the mobile device 150, the mobile device 150 may attempt to establish contact with a TSM computer, such as the TSM computer 110 illustrated in FIG. 1. In this regard, a secure element associated with the mobile device 150 may be unlocked, provisioned, and/or personalized.

At block 510, a secure element activation request may be generated by the mobile device 150 and output for communication to the TSM computer 110. For example, a request for the unlocking and/or provisioning of various information may be generated and output. In certain embodiments, the request may be generated during an enrollment process of the mobile device 150 with the TSM computer 110. In other embodiments, the request may be generated during a setup process for the secure element.

The request may be received by the TSM computer 110 at block 515. As desired in various embodiments, any number of suitable networks and/or communications techniques may be utilized to facilitate the communication of the request to the TSM computer 110. For example, the request may be communicated via a suitable carrier network, such as one of the carrier networks 180 illustrated in FIG. 1. In certain embodiments, the request may be communicated directly to the TSM computer 110. In other embodiments, the request may be communicated through any number of intermediary systems and/or devices, such as an MNO computer 140. In certain embodiments, a secure communications channel may be established between the mobile device 150 and the TSM computer 110 either prior to the communication of the request or as a result of the communication.

At block 520, which may be optional in certain embodiments of the disclosure, the TSM computer 110 may generate a request for various identification information associated with the secure element, such as CPLC information and/or other secure element identification information, and the generated request may be communicated to the mobile device 150. At block 525, the request for secure element identifying information may be received and processed by the mobile device 150. The requested information (e.g., the CPLC information, etc.) may then be communicated by the mobile device 150 to the TSM computer 110 at block 530, and the TSM computer 110 may receive the requested information at block 535. As an alternative to the TSM computer 110 requesting secure element identifying information, various identifying information (e.g., CPLC information, etc.) may be included in the initial request. Additionally, in certain embodiments of the disclosure, a secure communications channel may be established between the mobile device 150 and the TSM computer 110 prior to the communication of secure element identifying information to the TSM computer 110.

At block 540, the TSM computer 110 may process the received secure element information in order to identify information that may be utilized to unlock the secure element. For example, received CPLC data may be evaluated in order to identify information that may be utilized to determine and/or derive a key for unlocking the secure element. A wide variety of unlocking information may be included CPLC data as desired in various embodiments of the disclosure, such as an identifier of a secure element manufacturer or fabricator, an identifier of a master key to be utilized (e.g., a numerical indicator associated with a stored master key associated with the secure element manufacturer, etc.), an indicator of a method utilized to initially lock the secure element, and/or an indicator of a method to be utilized to derive a key to unlock the secure element. In certain embodiments, at least a portion of the key information and/or locking information may be stored in one or more fields of the CPLC data that are conventionally untouched or disregarded by a chip manufacturer (e.g., fields that are conventionally filled with all zeroes). Additionally, in certain embodiments, the locking information may initially be incorporated into the CPLC data by the secure element manufacturer.

The TSM computer 110 may perform a wide variety of suitable processes in order to identify or derive a key that may be utilized to unlock the mobile device. For example, a secure element manufacturer and a master key identification number (e.g., 001, 002, 003, etc.) may be utilized to identify a stored master key that may be utilized to unlock the secure element. As another example, a secure element manufacturer and an identifier (e.g., 001, 002, 003, etc.) of a locking technique, such as an AES derivation technique, a triple DES derivation technique, etc., may be utilized to identify and/or derive a key that may be utilized to unlock the secure element. In certain embodiments, a master key associated with a manufacturer and locking technique may be accessed from memory. In other embodiments, a master key may be derived based upon any combination of received and/or stored information. Once the master key has been identified, operations may continue at block 545.

At block 545, the TSM computer 110 may request an MNO computer 140 associated with the mobile device 150 to activate or wake up an OTA proxy or OTA proxy application associated with the mobile device 150. For example, the MNO computer 140 may be requested to wake up an OTA proxy that is stored on a general or shared memory or general operation chip associated with the mobile device 150. The OTA proxy activation request may be received by the MNO computer 140 at block 550, and the MNO computer 140 may communicate an appropriate OTA proxy wake up request to the mobile device 150. The OTA proxy wake up request may be received by the mobile device 150 at block 555, and a suitable OTA application associated with the mobile device 150 may communicate an OTA proxy message to the TSM computer 110 at block 560. The OTA proxy message may be received by the TSM computer 110 at block 565, and an OTA communications session may be established between the mobile device 150 and the TSM computer 110.

At block 570, secure element unlocking information, such as a master key, may be communicated to and/or driven to the mobile device 150 by the TSM computer 110. In other words, a key for unlocking the secure element may be provided to the mobile device 150 for use in unlocking and/or initiating the secure element. Additionally, as desired, a wide variety of other information may be communicated to the mobile device for storage on and/or provisioning on the secure element, such as various applications (e.g., an authentication application, etc.), financial account data, and/or additional key information (e.g., rotated keys, etc.).

The key information and/or other information authentication may be received by the mobile device 150 at block 575. The key information may then be utilized to "unlock" the secure element. In certain embodiments, various applications, authentication information, and/or financial account data may also be stored on or provisioned to a secure element. For example, a general purpose chip associated with the mobile device 150 may receive the unlocking information and/or the provisioning information, and the general purpose chip may provide the received information to the secure element. Once the secure element has been unlocked and provisioned, the secure element may be utilized for a wide variety of suitable purposes, such as authentication purposes.

The method 500 may end following block 575.

The operations described and shown in the methods 300, 400, and 500, of FIGS. 3-5 may be carried out or performed in any suitable order as desired in various embodiments of the disclosure. Additionally, in certain embodiments, at least a portion of the operations may be carried out in parallel. Furthermore, in certain embodiments, less than or more than the operations described in FIGS. 3-5 may be performed.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for incorporating identification information into device communications, the method comprising:
   receiving, by a secure element associated with a mobile device from an application stored on a separate memory of the device, a message to be communicated to a recipient;
   associating, by the secure element, secure element identification information into the received message to compose a modified message, wherein the secure element identification information comprises card production life cycle (CPLC) information;
   providing, by the secure element, the modified message to the application; and
   directing, by the application, communication of the modified message to the recipient,
   wherein the recipient utilizes the secure element identification information to identify an originator of the message, and wherein the recipient utilizes at least a portion of the secure element identification information to generate a key that facilitates unlocking of the secure element.

* * * * *